United States Patent
Rippon et al.

(10) Patent No.: US 8,103,291 B2
(45) Date of Patent: Jan. 24, 2012

(54) LEVERAGING LOCATION BASED SERVICES FOR POWER CONSERVATION IN MULTI-MODE WIRELESS COMMUNICATION DEVICES

(75) Inventors: William J. Rippon, Putnam Valley, NY (US); David W. Nielsen, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/200,063

(22) Filed: Aug. 28, 2008

(65) Prior Publication Data

US 2010/0056181 A1    Mar. 4, 2010

(51) Int. Cl.
*H04W 24/00* (2009.01)

(52) U.S. Cl. .......... 455/456.3; 455/456.1; 455/456.2; 455/552.1

(58) Field of Classification Search .......... 455/456.1, 455/552.1, 456.2, 456.3, 46.5, 456.6
See application file for complete search history.

(56) References Cited

U.S. PATENT DOCUMENTS

| | | | |
|---|---|---|---|
| 2002/0193108 A1* | 12/2002 | Robinett | 455/427 |
| 2005/0232200 A1* | 10/2005 | Jeong et al. | 370/331 |
| 2006/0004643 A1 | 1/2006 | Stadelmann et al. | |
| 2006/0063560 A1* | 3/2006 | Herle | 455/552.1 |
| 2006/0202818 A1* | 9/2006 | Greenberg | 340/539.13 |

* cited by examiner

*Primary Examiner* — Nick Corsaro
*Assistant Examiner* — Amanuel Lebassi
(74) *Attorney, Agent, or Firm* — Scully, Scott, Murphy & Presser, P.C.; Daniel P. Morris, Esq.

(57) ABSTRACT

A power saving and security enabling method, system, computer program product, and program storage device are disclosed. Wireless communication technology transceivers in a multi-mode wireless communication device are activated and deactivated based on a location detected by a location-based service system. A set of wireless network connection profiles control activation and deactivation of the wireless communication technology transceivers. Reduction in power consumption and improvement in security is achieved by only activating wireless communication technology transceivers when need and deactivating any other transceivers which are not currently connected to a wireless communication network.

24 Claims, 3 Drawing Sheets

LEVERAGING LOCATION BASED SERVICES FOR POWER CONSERVATION IN MULTI-MODE WIRELESS COMMUNICATION DEVICES

BACKGROUND OF THE INVENTION

1. Fields of the Invention

The present invention relates generally to saving power and improving security in wireless communication devices. More particularly, the present invention is related to activating and deactivating wireless communication technology transceivers within a multi-mode wireless communication device based on the multi-mode wireless communication device's current location.

2. Description of the Prior Art

Current multi-mode wireless communication devices (i.e., a wireless phone supporting one or more wireless communication technologies) typically achieve mobility between wireless communication technologies (e.g., switching from Wi-Fi wireless network to WiMAX wireless network without losing connectivity) in one of two ways: the first approach is to have all wireless communication technologies (e.g., Wi-Fi, Bluetooth, IEEEE 802.11) supported in the multi-mode wireless communication device active simultaneously. This first approach allows the wireless communication device to automatically switch between wireless communication technologies. The problem with the first approach is that battery life of the wireless communication device is significantly reduced, as each wireless communication technology transceiver must remain active and searching for signals. Another problem with the first approach is that wireless communication technology transceivers that are enabled but not securely connected can become an attack (e.g., hacking or eavesdropping) target. Furthermore, certain wireless communication technology transceivers for wireless communication technologies such as cellular (CDMA, GSM, Etc.) or IEEE 802.11 (a set of standards for wireless local area network developed by IEEE LAN/MAN Standards Committee) spends more energy (drawing more power) when the wireless communication technology transceiver is scanning for an available signal from a service provider (e.g., Verizon®, AT&T®, Sprint®) than wireless communication technology transceiver spends when it has an established connection with a service provider. A second approach is to require a user to manually change a wireless network connection profile (e.g., a set of rules for activating and deactivating a wireless network (e.g., Wi-Fi wireless LAN) or settings (e.g., a configuration of a wireless communication device)) to activate or deactivate wireless networks as needed. However, this second approach reduces productivity and precludes seamless mobility.

Therefore, it would be highly desirable to provide power conservation and improved security in a multi-mode wireless communication device.

SUMMARY OF THE INVENTION

The present invention is directed to a system and method for leveraging a Global Positioning System (GPS) or other types of location-based service systems to activate and deactivate certain wireless transceivers within a multi-mode wireless communication device as needed. The present invention manages intelligently (e.g., by utilizing a location-based service system) when and where each wireless communication technology transceiver within a multi-mode wireless communication device is enabled. The present invention provides automated mobility (i.e., automating activation and deactivation of wireless communication technology transceivers within a multi-mode wireless communication device) leveraging a location-based service system (e.g., GPS) to reduce power consumption, extend battery life, and increase security.

In one embodiment, the present invention includes a system for providing power conservation and security in a multi-mode wireless communication device, the multi-mode wireless communication device having one or more wireless communication technology transceivers for one or more wireless communication technologies, the system comprising:

a location-based service system for determining a multi-mode wireless communication device's current location;

a zone constructing means for constructing available service areas of each wireless communication technology based on the multi-mode wireless communication device's current location;

an activating means for activating an available wireless communication technology transceiver within the multi-mode wireless communication device based on the multi-mode wireless communication device's current location; and a deactivating means for deactivating unavailable wireless communication technology transceivers within the multi-mode wireless communication device based on the multi-mode wireless communication device's current location, wherein power use of said device is conserved and security of said device is improved.

In one embodiment, the present invention includes a method for providing power conservation and security in a multi-mode wireless communication device, the multi-mode wireless communication device having one or more wireless communication technology transceivers for one or more wireless communication technologies, the method comprising:

determining, via a location-based service system, a multi-mode wireless communication device's current location;

constructing available service areas of each wireless communication technology based on the multi-mode wireless communication device's current location;

activating an available wireless communication technology transceiver within the multi-mode wireless communication device based on the multi-mode wireless communication device's current location; and deactivating unavailable wireless communication technology transceivers within the multi-mode wireless communication device based on the multi-mode wireless communication device's current location, wherein power use of said device is conserved and security of said device is improved.

In one embodiment, a location-based service system within in a multi-mode wireless communication device is utilized to construct available service areas (e.g., an area where a connection to a preferred network could be made) where a wireless network of a particular wireless communication technology is available. When the multi-mode wireless communication device enters the available service areas, a wireless communication technology transceiver of the particular wireless communication technology is activated in an attempt to be connected with a target wireless network. Once the multi-mode wireless communication device loses contact with the currently connected wireless network or leaves the available service area, the wireless communication technology transceiver is deactivated. In another embodiment, the location-based service system is utilized to mark locations where wireless networks of a particular wireless communication technology and service providers (e.g., Verizon®, AT&T®, Sprint®) if applicable, are available. When the multi-mode wireless communication device comes in range (e.g., Wi-Fi wireless network has a range of 32 m (120 ft) to 95 m (300 ft); IEEE 802.11 wireless network has a range of 300 ft to 600 ft) of the particular wireless communication technology, the wireless communication technology transceiver of the particular wireless communication technology is activated.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 2A:
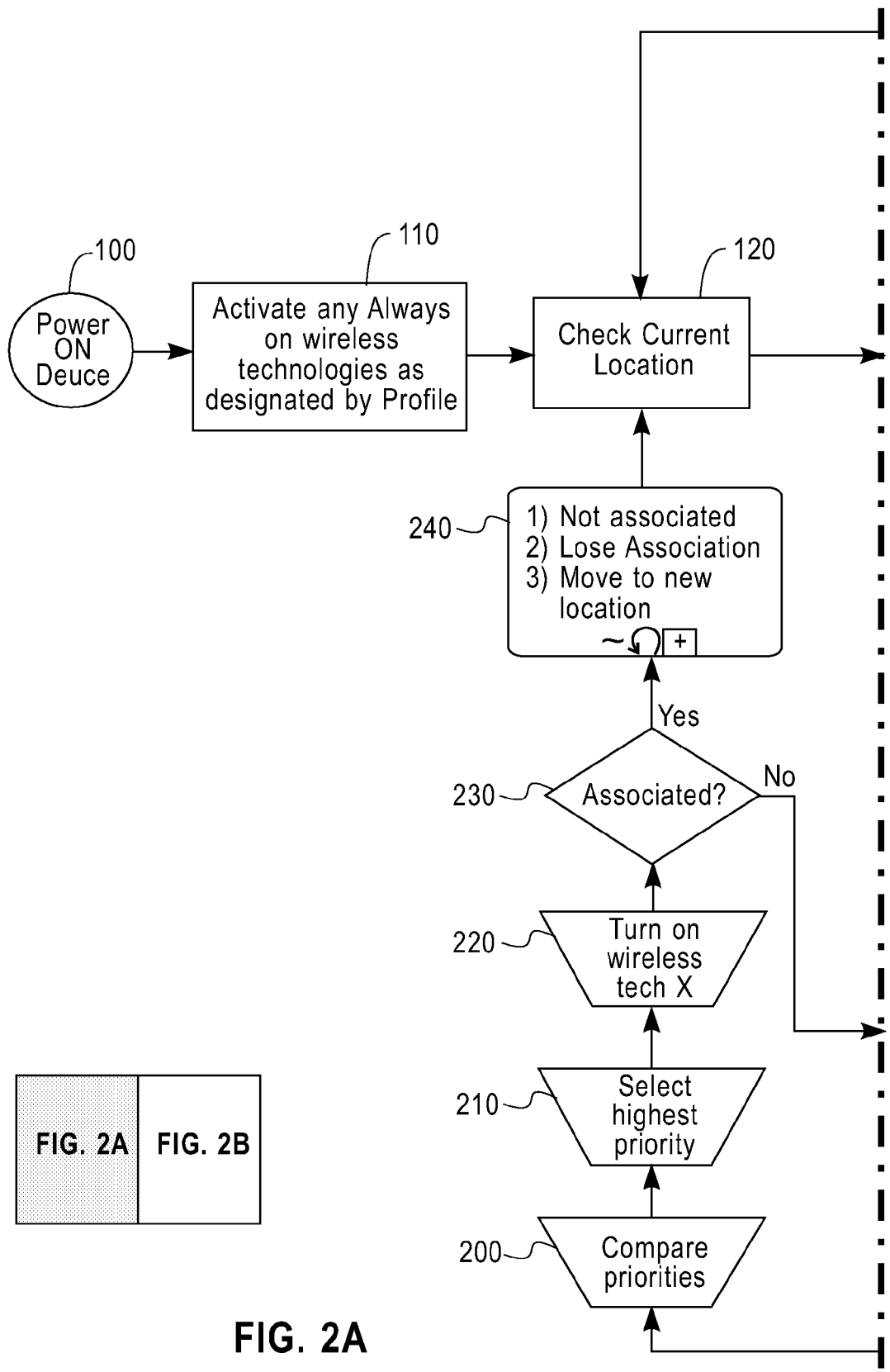
FIG. 2 depicts a flow chart that the present invention employs.
Figure 2B:
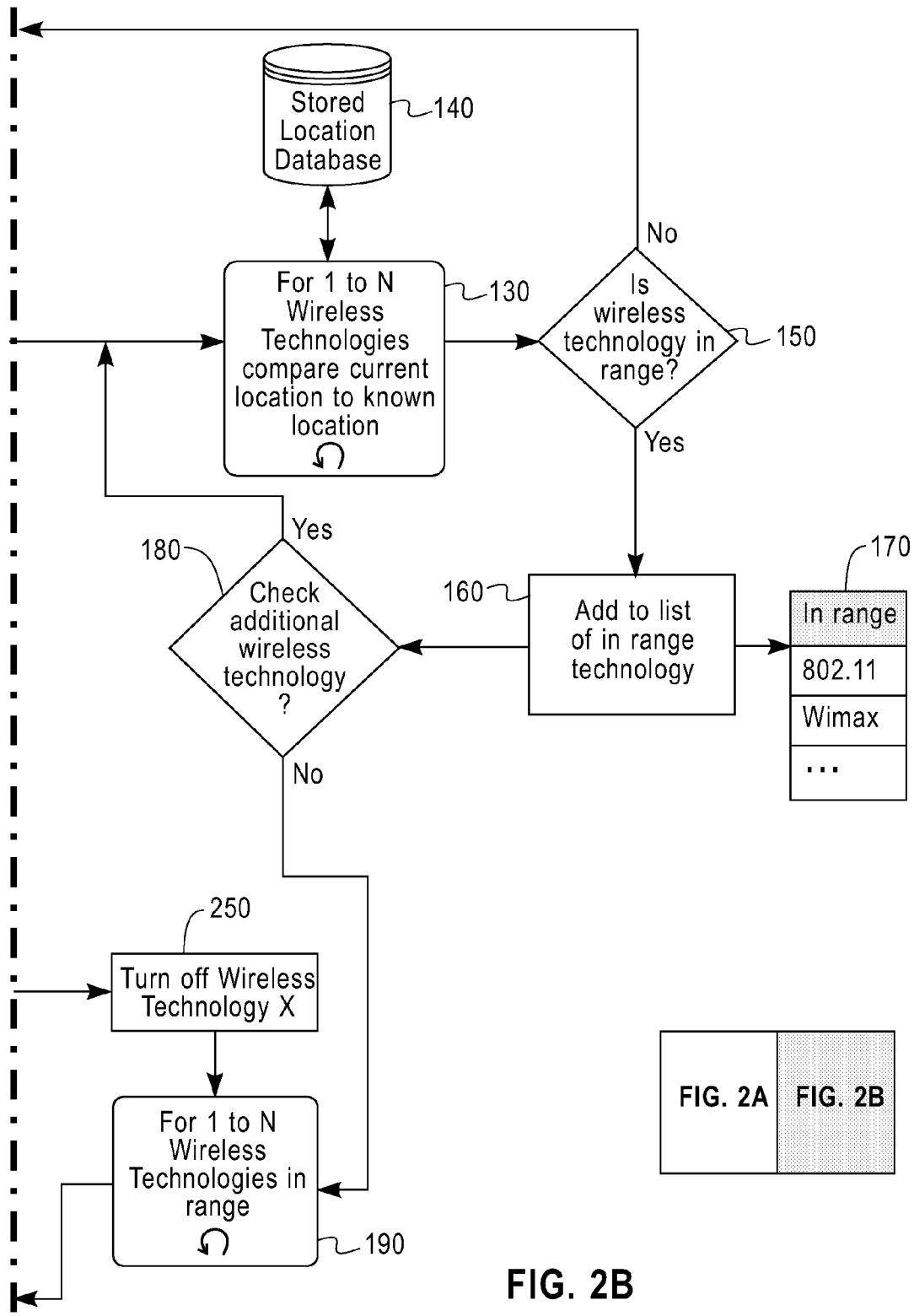

FIG. 2 illustrates a flow chart that the present invention employs. At step 100, a user turns on a multi-mode wireless communication device (i.e., a wireless phone supporting one or more wireless communication technologies and having at least one location-based service system). The supported wireless communication technology in the multi-mode wireless communication device includes, but is not limited to, one or more of: CDMA (Code Division Multiple Access), GSM (Global System for Mobile), IEEE 802.11, Wi-Fi, HSDPA (High-Speed Downlink Packet Access), W-CDMA (Wideband Code Division Multiple Access), WiMAX (Worldwide Interoperability for Microwave Access), OFDM (Orthogonal Frequency Division Multiplexing), EVDO (Evolution-Data Optimized), UMTS (Universal Mobile Telecommunications System), Bluetooth, EDGE (Enhanced Data rates for GSM Evolution) and LTE (Long Term Evolution). At step 110, a default wireless communication technology transceiver (e.g., a cellular transceiver) is activated. In one embodiment, a wireless network connection profile (e.g., a set of rules for activation and deactivation of wireless communication technologies) is established to define the default wireless communication technology (e.g., CDMA or GSM) that is always and anytime active. At step 120, a location-based service system (e.g., a GPS or GPS-based transceiver located on or embedded within the multi-mode wireless communication device) checks a current location of the multi-mode wireless communication device. The location-based service system includes, but is not limited to, a GPS (Global Positioning System), Galileo (i.e., a global navigation satellite system built by the European Union and the European Space Agency), GLONASS (i.e., a global navigation satellite system developed by the former Soviet Union and now operated for Russian government), IRNSS (Indian Regional Navigational Satellite System), Beidou Navigation System (i.e., an independent navigation system developed by China), QZSS (Quasi-Zenith Satellite System), Assisted GPS, Sprint® Navigation, VZ® Navigator (i.e., GPS navigation software by Verizon® wireless), and an inertial navigation system.

At step 130, for 1 to N wireless communication technologies that are supported in the multi-mode wireless communication device, the current location of the multi-mode wireless communication device is compared to known locations. The known locations are a set of locations where one or more wireless communication technologies in the multi-mode wireless communication device are available to provide a wireless network connection for the user. In one embodiment, the known locations are stored in a location database in a storage device 140. The location database in the storage device 140 stores a set of available service areas or available service locations per each wireless communication technology supported in the multi-mode wireless communication device and respective service providers (e.g., Verizon®, Sprint®, AT&T®) associated with the available service areas or available service locations. The current location is used to populate a dynamic list of in range technology 170 with a set of available wireless communication technologies and their respective service providers. In one embodiment, the location database is embedded in a memory storage device 140 inside the multi-mode wireless communication device. In another embodiment, the location database in the storage device 140 is separated from the multi-mode wireless communication device and communicates with the multi-mode wireless communication device through a communication link (e.g., a wireless communication link).

Step 150 checks whether a wireless communication technology is available at the current location of the multi-mode wireless communication device or whether the current location of the multi-mode wireless communication device is in range (e.g., Wi-Fi wireless network has a range of 32 m (120 ft) to 95 m (300 ft); IEEE 802.11 wireless network has a range of 300 ft to 600 ft) of one of the known locations. In one embodiment, each wireless communication technology supported in the multi-mode wireless communication device has a wireless network connection profile. The wireless network connection profile stores physical range characteristics of associated wireless communication technology (e.g., IEEE 802.11 wireless network has a range of 300 ft to 600 ft). If an available wireless communication technology at the current location is found out, at step 160, the available wireless communication technology is added to a list of in range technology 170. For example, WiMAX (Worldwide Interoperability Microwave Access; a telecommunication technology aimed at providing wireless data over long distances in a variety of ways) may be determined as an available wireless communication technology at the current location of the multi-mode wireless communication device. Thus, WiMAX technology is added to the list of in range technology 170. If no available wireless communication technology is found out at the current location, at step 120, the location-based service system is activated to check a current location of the multi-mode wireless communication device. In one embodiment, to save battery life of the multi-mode wireless communication device, after the multi-mode wireless communication device detects an available wireless communication technology at the current location, the location-based service system operates at a sleep mode (i.e., a low power consumption mode; e.g., not actively operating to detect a current location of the multi-mode wireless communication device). In another embodiment, the location-based service system operates at a sleep mode for a pre-determined time period. For example, if the pre-determined time period is defined as 10 minutes, the location-based service system operates at a sleep mode every 20 minutes for 10 minutes.

In one embodiment, when an available wireless communication technology is detected, wireless communication technology transceivers associated with other wireless communication technology are turned off to save power consumption of the multi-mode wireless communication device. In another embodiment, the wireless communication technology transceivers are turned off, when they are either not in range (e.g., IEEE 802.11 wireless network has a range of 300 ft to 600 ft) or are not desired in the wireless network connection profiles related to a current location.

In one embodiment, the location-based service system is put in a sleep mode to reduce power consumption, while the multi-mode communication device is attaching (i.e., connecting) to an available wireless communication network, after the available wireless communication network is known or detected at a current location of the multi-mode wireless communication device. In another embodiment, while the multi-mode wireless communication device is connected to a particular wireless communication network associated with a particular wireless communication technology, the location-based service system is turned off periodically based on a physical range characteristic of the particular wireless communication technology. In a further embodiment, the location-based service system is re-activated automatically if the multi-mode wireless communication device loses its connection or association with the currently activated wireless communication technology. For example, while the multi-mode wireless communication device is connected with an IEEE 802.11 wireless network, the multi-mode wireless communication device calculates a period or frequency that the location-based service system can be turned off based on a moving speed of the multi-mode wireless communication device and a physical range characteristic (e.g., IEEE 802.11 wireless network range is 600 ft) of the IEEE 802.11. Then, the location-based service system is turned off during that period or based the frequency, by assuming the multi-mode wireless communication device is within the physical range (e.g., 600 ft) of the connected wireless network (e.g., IEEE 802.11) during the period.

At step 180, it is checked whether any additional wireless communication technologies are available at the current location of the multi-mode wireless communication device. In particular, steps 130-160 are performed again to look for additional available wireless communication technologies. For example, if IEEE 802.11 is found out as an additionally available wireless communication technology through steps 130-160, the IEEE 802.11 is also added to the list of in range technology 170. When no additionally available wireless communication technology is found out, the multi-mode wireless communication device retrieves wireless network connection profiles associated with the available wireless communication technologies in the list of in range wireless communication technology 170 at step 190. In one embodiment, a wireless network connection profile of a particular wireless communication technology stores parameters for, but not limited to, priority of the particular wireless communication technology in relation to other wireless communication technologies, priority of a service provider (e.g., associated with the particular wireless communication technology) in relation to other service providers, cost associated with wireless communication technologies, what wireless communication technologies can be simultaneously activated, what service providers can be simultaneously activated, physical range characteristics of the particular wireless communication technology, etc. In one embodiment, such stored network connection profiles are described to ensure minimum battery or power source drain.

At step 200, priority information (e.g., from wireless network communication profiles) of available wireless communication technologies in the list in range technology 170 are compared to each other. At step 210, an available wireless communication technology that has the highest overall preference (e.g., priorities based on signal strength and/or cost of a service), based on multiple factors (e.g., cost, locations, priorities), is selected. In one embodiment, a user could prioritize wireless communication technologies in a variety of ways, when a wireless network connection profile associated with a location suggests that multiple wireless communication technologies could be activated, preferences and priorities in the profile will determine if one or more of the available technologies should be activated—one user might prioritize a signal strength and a bandwidth of each wireless communication technology while another user might prioritize cost of a service over other factors. At step 220, a corresponding transceiver of the selected available wireless communication technology is activated. At step 230, the device attempts to associate with the wireless network technology (and provider where applicable) selected in step 220, in order to provide network connectivity, e.g., Internet connection, to a user. In the event that the corresponding transceiver does not successfully associate using the wireless network technology (and provider where applicable) selected in step 220, the corresponding transceiver is deactivated at step 250. Though Steps 190-230 another available wireless communication technology that has next highest overall preference is tried. After the multi-mode wireless communication device is connected to a wireless network via a wireless communication technology transceiver, which is successfully associated and providing a service to the user at step 230, the user may move to a new location with the multi-mode wireless communication device at step 240. The user's movement to the new location may cause the multi-mode wireless communication device to lose connectivity with the currently connected wireless network due to a persistent nature of the wireless communication technology transceiver. Then, a location-based service system (e.g., a GPS-based transceiver) is activated to detect the new location of the multi-mode wireless communication device. The new location is provided to the location database to find out a newly available wireless communication technology at the new location. Then, the multi-mode wireless communication technology device tries to connect to a wireless network via a wireless communication technology transceiver that is associated with the newly available wireless communication technology. Though FIG. 2 illustrates activating mechanism (i.e., activating wireless transceiver(s) based on a current location), one of ordinary skilled in the art understands that FIG. 2 can be applied for deactivating mechanism (i.e., deactivating wireless transceiver(s) based on a current location).

In one embodiment, there is a signal strength detector within the multi-mode wireless communication device. If the signal strength detector senses signal strength between the multi-mode wireless communication device and a currently connected wireless network and if the signal strength detected by the signal strength detector becomes lower than a pre-determined threshold, the signal strength detector activates a location-based service system within the multi-mode wireless communication device. Then, the activated location-based system detects a current location of the multi-mode wireless communication device. Then, it is checked whether there are one or more available wireless communication technologies at the current location through communicating with the location database. Then, each available wireless communication technology transceiver of each available wireless communication technology is temporarily activated to measure signal strength between the multi-mode wireless communication device and each wireless network based on each available wireless communication technology. Then, a wireless communication technology transceiver associated with a wireless network having the strongest signal strength is finally selected to be activated. Then, other wireless communication technology transceivers that were not selected are deactivated, unless the wireless network connection profile at the current location does not require multiple simultaneous activations of wireless communication technology transceivers.

In one embodiment, to save battery power of the multi-mode wireless communication device, after the multi-mode wireless communication device is successfully connected to a wireless network via an available wireless communication technology transceiver, the location-based service system is deactivated (e.g., turned off). The location-based service system is re-activated when the multi-mode wireless communication device loses connectivity with the currently connected wireless network or signal strength between the currently connected wireless network and the multi-mode wireless communication device becomes lower than a pre-determined threshold. In a further embodiment, the location-based service system is deactivated or activated based on a predetermined timeframe. For example, if the predetermined timeframe is 10 minutes, the location-based service system is deactivated every 20 minutes for 10 minutes.

In one embodiment, a location-based service system within a multi-mode wireless communication device is utilized to construct available service areas (e.g., an area where wireless network connections can be made) where a wireless network of a particular wireless communication technology is available. The location-based service system can mark a location where the wireless network of the particular wireless communication technology is available. Based on physical range characteristics of the particular wireless network (e.g., Wi-Fi wireless network has a range of 32 m (120 ft) to 95 m (300 ft); IEEE 802.11 wireless network has a range of 300 ft to 600 ft), an available service area of the particular wireless communication technology is constructed. When the multi-mode wireless communication device enters the available service areas, a wireless communication technology transceiver of the particular wireless communication technology is activated in order to connect to the wireless network. Once the multi-mode wireless communication device loses contact with the currently connected wireless network or leaves the available service area, the wireless communication technology transceiver is programmed to become deactivated. In another embodiment, the location-based service system is utilized to mark locations where wireless network of a particular wireless communication technology are available. When the multi-mode wireless communication device comes in range (e.g., Wi-Fi wireless network has a range of 32 m (120 ft) to 95 m (300 ft); IEEE 802.11 wireless network has a range of 300 ft to 600 ft) of the particular wireless communication technology, the wireless communication technology transceiver of the particular wireless communication technology is activated. For example, a cellular phone that includes GPS and WiFi connectivity creates two wireless network connection profiles: One wireless network connection profile for a home WiFi network and another wireless network connection profile for an office WiFi network. The profiles record locations (e.g., wireless network connection profile for the home WiFi network records a location of WiFi network at home) that are provided by the GPS within the cellular phone. The WiFi transceiver in the cell phone is only activated when the cell phone comes in range (Wi-Fi wireless network has a range of 32 m (120 ft) to 95 m (300 ft)) of a location of the home WiFi network or a location of the office WiFi network.

Once the cell phone leaves in range of the location (e.g., of the home WiFi network or the office WiFi network), the WiFi transceiver is deactivated.

In one embodiment, a wireless network connection profile is created for each location where the multi-mode wireless communication device can be connected to a wireless network via one or more wireless communication technologies supported in the multi-mode wireless communication device. The wireless network connection profile of a certain location stores available wireless communication technologies at the location, available service providers at the location, priorities among the available wireless communication technologies, priorities among service provides, what technologies can be simultaneously activated, what service providers can simultaneously activated, physical range characteristics of each available wireless communication technology. In one embodiment, wireless net-work connection profiles are stored at the location database. Upon providing a current location of the multi-mode wireless communication device, a wireless network connection profile associated with the current location is retrieved.

In another embodiment, a wireless network connection profile is a set of rules for controlling activation and deactivation of wireless communication technologies (e.g., when and where a wireless communication technology is activated or deactivated). The multi-mode wireless communication device iteratively checks its current location based on information from a location-based service system such as a GPS. Then, it is determined what wireless communication technologies are affected or enabled by a current location of the multi-mode wireless communication device. If there are wireless communication technology transceivers that are currently activated but are no longer valid at the current location, these wireless communication technology transceivers are turned off. If there are one or more wireless communication technologies that are available for the current location, the wireless network connection profiles associated with the one or more wireless communication technologies are reviewed. The wireless network connection profiles have a set of pre-defined selection criteria (e.g., priority or preference information), which the multi-mode wireless communication device uses to manage activation or deactivation of wireless communication technologies based on what is currently available from one or more wireless communication technologies, provided by one or more service providers. For example, wireless communication technology transceivers associated with the one or more wireless communication technologies attempt to provide a wireless network connection to a user in an order based on cost. The wireless network connection profiles associated with the one or more wireless communication technologies may indicate that for this particular location, 2 or more wireless communication technologies should be activated. In an event that a higher priority wireless communication technology transceiver is activated but does not successfully associate with providing a wireless network connection to a user, the wireless communication technology transceiver is deactivated and a next highest priority wireless communication technology transceiver is activated and attempts to provide a wireless network connection to a user.

In one embodiment, the multi-mode wireless communication device has a default "always-on" wireless communication technology transceiver (i.e., a wireless technology communication transceiver which is set as a default and always active). In a case where a service provider (e.g. Sprint®, AT&T®, Verizon®, Etc.) knows a set of locations where the default "always-on" wireless communication technology transceiver can not be activated due to lack of wireless communication facilities (e.g., lack of base stations), the default "always-on" wireless communication technology transceiver can be deactivated at the set of locations to conserve power dissipation. In this embodiment, the location-based service system remains active to detect a known location where a wireless communication technology associated with the default "always-on" wireless communication technology transceiver is available as early as possible.

Figure 1:
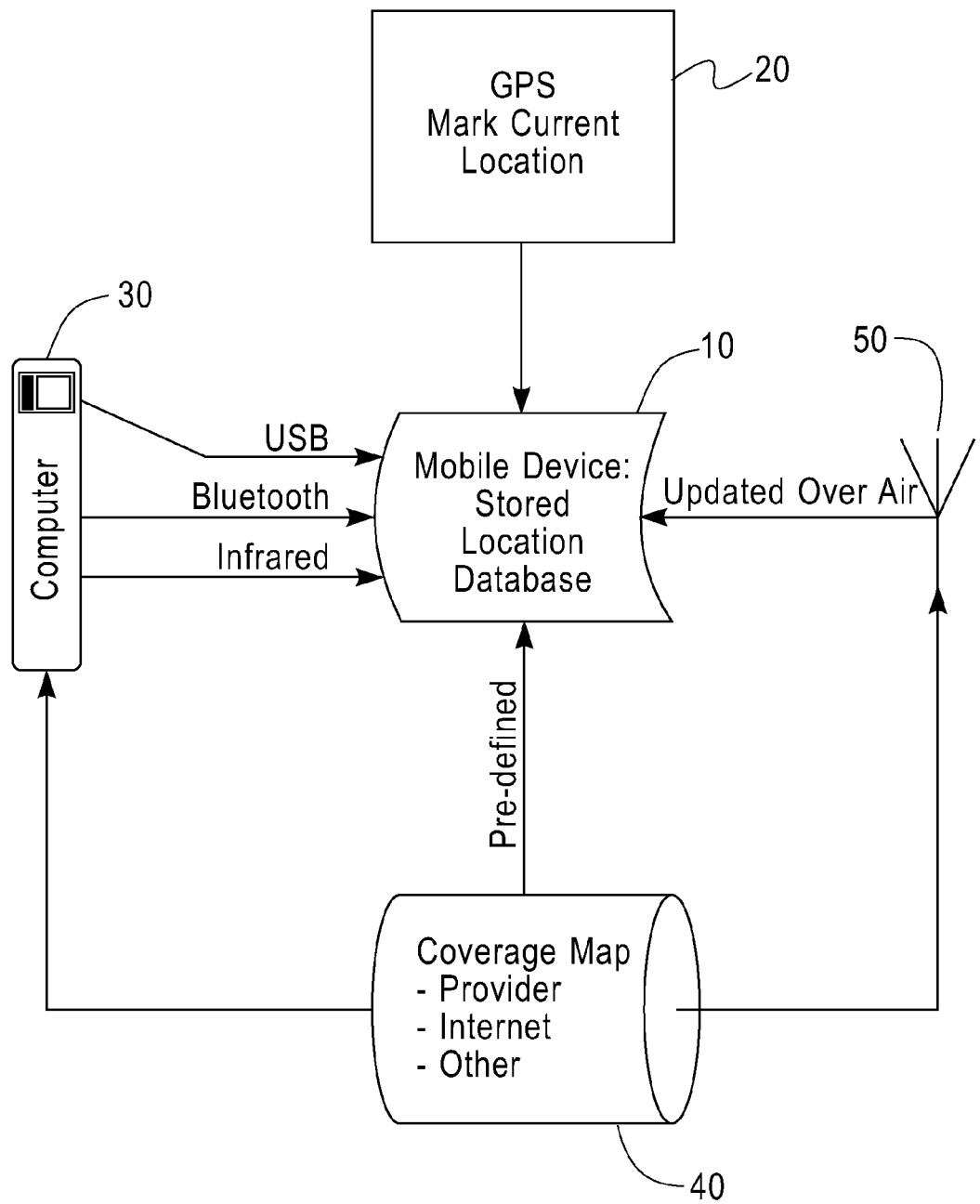
FIG. 1 depicts a block diagram of managing and updating available service areas in a location database within a multi-mode wireless communication device.

FIG. 1 depicts a block diagram of managing and updating available service areas (i.e., an area where a multi-mode wireless communication device can be connected to a wireless network based on a wireless communication technology via an associated wireless communication technology transceiver) in the location database within a multi-mode wireless communication device. A multi-mode wireless communication device such as a mobile device 10 stores a location database. In one embodiment, the location database is a separate entity. The multi-mode wireless communication device communicates with the location database and a processing server via a communication link (e.g., a wireless communication link). The location database stores a set of available wireless communication technologies per each location and respective service providers per each location. Each location is marked and recognized by a location-based service system (e.g., a GPS 20). The location database within the multi-mode wireless communication device 10 can be updated by manually or automatically downloading available service areas for each wireless communication technology via USB (Universal Serial Bus), Bluetooth A, and Infrared from a computing device 30 (e.g., a personal computer, a server). In one embodiment, when the multi-mode wireless communication device turns on or is activated, pre-defined available service areas of each wireless communication technology (e.g., supported in the multi-mode wireless communication device) are downloaded (e.g., via a paging channel) in a form of a coverage map. The coverage map includes service providers for each available service area, available service areas of each wireless communication technology, what services (e.g., Internet connection) are provided at each service area, etc. While the multi-mode wireless communication device 10 is operating, a service provider (e.g., Verizon®, Sprint®) may update available service areas (e.g., over the air 50) for each wireless communication technology provided by the service provider.

In one embodiment, while visiting a new location, when the multi-mode wireless communication device 10 detects a new available wireless network based on a particular wireless communication technology (e.g., by activating each wireless communication technology transceiver temporarily). In another embodiment, detecting a new available wireless network may be done manually by a user, who is sitting in a new location with as yet unknown services. The user may manually activate and scan for available services. Once the user finds a service that they desire (based on a combination of wireless communication technology, available service and appropriate provider), the user leverages the location-based service system to mark a new location where the new available wireless network can be utilized. Then, the location-based service system obtains the new location information. Then, the new location information is recorded in a wireless network connection profile of a particular wireless communication technology associated with the new available wireless network. In one embodiment, a logical component is added to the multi-mode wireless communication device to obtain a specific physical location information (e.g., a longitude/latitude location) of the new location and constructs an available service area of the new location (e.g., the multi-mode wireless communication device 10 can be connected to a wireless network based on the particular wireless communication technology within 600 ft from the new location) based on physical range characteristics of the particular wireless communication technology (e.g., Wi-Fi wireless network has a range of 32 m (120 ft) to 95 m (300 ft); IEEE 802.11 wireless network has a range of 300 ft to 600 ft). In this embodiment, a new wireless network connection profile is created for the new location. The new wireless network connection profile stores the available service area of the new location for the particular wireless communication technology.

In one embodiment, the multi-mode wireless communication device leverages a location-based service (e.g., a GPS, GALILEO, GLONASS, etc.) to determine whether the multi-mode wireless communication device is within an available service area, which is specified in one of wireless network connection profiles. The location-based service is constantly updating an exact current location of the multi-mode wireless communication device. As the multi-mode wireless communication device moves, the multi-mode wireless communication device constantly calculates whether the multi-mode wireless communication device enters and leaves an available service area. When the multi-mode wireless communication device enters an available service area of a particular wireless communication technology, the multi-mode wireless communication device automatically activates an associated wireless network transceiver. When the multi-mode wireless communication device leaves an available service area of a particular wireless communication technology, the multi-mode wireless communication device deactivates the associated wireless network transceiver.

In one embodiment, with a use of a location-based service (e.g., a GPS, GALILEO, GLONASS, etc.), the present invention constructs available service areas for wireless communication technologies within a multi-mode wireless communication device. An individual wireless communication technology transceiver based on a wireless communication technology is only enabled, if the multi-mode wireless communication device is in an available service area of the wireless communication technology based on the multi-mode wireless communication device's location at that time. In one embodiment, available service areas are pre-defined in a wireless network connection profile associated with a wireless communication technology. In another embodiment, available service areas are pre-defined in a wireless network connection profile associated with a location. After an individual wireless communication technology transceiver is activated and the multi-mode wireless communication device can be connected to a wireless network via the individual wireless communication technology transceiver, other wireless communication technology transceivers are deactivated to save battery power. In addition, by keeping other wireless communication technology transceivers deactivated, a risk of attacking/hacking through an open wireless communication technology on the multi-mode wireless communication device is reduced.

As described above, one embodiment of the present invention activates and deactivates wireless communication technology transceivers of a multi-mode wireless communication device based on a current location of the multi-mode wireless communication device. One embodiment of the present invention associates a location with a wireless network connection profile of the multi-mode wireless communication device. One embodiment of the present invention enables manually and automatically downloading available service areas for a wireless communication technology into the multi-mode wireless communication device. One of ordinary skilled in the art understands that embodiments of the present invention can be applied to a wireless communication, satellite communication, under the water communication, wired communication, etc.

Although the embodiments of the present invention have been described in detail, it should be understood that various changes and substitutions can be made therein without departing from the spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded into a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention.

What is claimed is:

1. A system for providing power conservation and security in a multi-mode wireless communication device, the multi-mode wireless communication device having three or more wireless communication technology transceivers for three or more wireless communication technologies, the system comprising:
   a location-based service system for determining the multi-mode wireless communication device's current location, the multi-mode wireless communication device operable and switching among the three or more wireless communication technologies;
   a zone constructing means for determining available service areas of each wireless communication technology based on the multi-mode wireless communication device's current location;
   an activating means for activating an available wireless communication technology transceiver within the multi-mode wireless communication device based on the multi-mode wireless communication device's current location; and
   a deactivating means configured to deactivate unavailable wireless communication technology transceivers within the multi-mode wireless communication device, based on the multi-mode wireless communication device's current location, said deactivating means further configured to place the location-based service system in a sleep mode, while one wireless communication technology transceiver within the multi-mode wireless communication device is activated, said deactivating means further configured to place the location-based service system in an active mode, while all wireless communication technology transceivers within the multi-mode wireless communication device are not activated.

2. The system according to claim 1, further comprising: a location associating means for associating each available service area constructed by the zone constructing means with a wireless network connection profile of the multi-mode wireless communication device.

3. The system according to claim 2, wherein the wireless network connection profile comprising one or more of: a set of rules for activating and deactivating wireless communication technology transceivers of the multi-mode wireless communication device according to the multi-mode wireless communication device's current location, and a set of predefined selection criteria that the multi-mode wireless communication device uses to manage activating and deactivating of wireless communication technology transceivers based on one or more wireless communication technologies provided from one or more service providers.

4. The system according to claim 3, wherein the wireless network connection profile comprising parameters, the parameters comprising one or more of: a priority of a wireless communication technology in relation to other wireless communication technologies supported in the multi-mode wireless communication device, a priority of a service provider in relation to other service providers associated with the multi-mode wireless communication device, cost associated with wireless communication technologies, what wireless communication technology transceivers within the multi-mode wireless communication device can be simultaneously activated, and physical range characteristics of each wireless communication technology supported in the multi-mode wireless communication device.

5. The system according to claim 4, wherein when a wireless communication technology transceiver associated with a wireless communication technology with a highest overall preference is activated but is not successfully associated with providing a service, another wireless communication technology transceiver associated with a wireless communication technology with a next highest overall preference is activated and tried to provide a service.

6. The system according to claim 1, further comprising: a storage device for storing a set of available service areas per each wireless communication technology supported in the multi-mode wireless communication device and respective service providers associated with the available service areas.

7. The system according to claim 1, further comprising: a downloading means for manually or automatically downloading available service areas of each wireless communication technology supported in the multi-mode wireless communication device.

8. The system according to claim 1, wherein the location-based service system is one or more of: GPS (Global Positioning System), Galileo, GLONASS, IRNSS, Beidou Navigation System, and QZSS (Quasi-Zenith Satellite System).

9. The system according to claim 1, wherein the three or more wireless communication technologies include: CDMA, GSM, IEEE 802.11, Wi-Fi, HSDPA, W-CDMA, WiMAX, OFDM, EVDO, UMTS, Bluetooth, EDGE and LTE.

10. The system according to claim 1, wherein while the multi-mode wireless communication device is connected to a particular wireless communication network associated with a particular wireless communication technology, the location-based service system is turned off periodically based on a physical range characteristic of the particular wireless communication technology.

11. The system according to claim 1, wherein the location-based service system is placed in a sleep mode for a pre-determined time period.

12. A method for providing power conservation and security in a multi-mode wireless communication device, the multi-mode wireless communication device having three or more wireless communication technology transceivers for three or more wireless communication technologies, the method comprising:
  determining, via a location-based service system, the multi-mode wireless communication device's current location, the multi-mode wireless communication device operable and switching among the three or more wireless communication technologies;
  determining available service areas of each wireless communication technology based on the multi-mode wireless communication device's current location;
  activating an available wireless communication technology transceiver within the multi-mode wireless communication device based on the multi-mode wireless communication device's current location;
  deactivating unavailable wireless communication technology transceivers within the multi-mode wireless communication device, based on the multi-mode wireless communication device's current location; and
  placing the location-based service system in a sleep mode, while one wireless communication technology transceiver within the multi-mode wireless communication device is activated, and placing the location-based service system in an active mode, while all wireless communication technology transceivers within the multi-mode wireless communication device are not activated.

13. The method according to claim 12, further comprising: associating each available service area constructed by the constructing with a wireless network connection profile of the multi-mode wireless communication device.

14. The method according to claim 13, wherein the wireless network connection profile comprising one or more of: a set of rules for activating and deactivating wireless communication technology transceivers of the multi-mode wireless communication device according to the multi-mode wireless communication device's current location, and a set of pre-defined selection criteria that the multi-mode wireless communication device uses to manage activating and deactivating of wireless communication technology transceivers based on one or more wireless communication technologies provided from one or more service providers.

15. The method according to claim 14, wherein the wireless network connection profile comprising parameters, the parameters comprising one or more of: a priority of a wireless communication technology in relation to other wireless communication technologies supported in the multi-mode wireless communication device, a priority of a service provider in relation to other service providers associated with the multi-mode wireless communication device, cost associated with wireless communication technologies, what wireless communication technology transceivers within the multi-mode wireless communication device can be simultaneously activated, and physical range characteristics of each wireless communication technology supported in the multi-mode wireless communication device.

16. The method according to claim 15, wherein when a wireless communication technology transceiver associated with a wireless communication technology with a highest overall preference is activated but is not successfully associated with providing a service, another wireless communication technology transceiver associated with a wireless communication technology with a next highest overall preference is activated and tried to provide a service.

17. The method according to claim 12, her comprising: storing a set of available service areas per each wireless communication technology supported in the multi-mode wireless communication device and respective service providers associated with the available service areas.

18. The method according to claim 12, further comprising: manually or automatically downloading available service areas of each wireless communication technology supported in the multi-mode wireless communication device.

19. The method according to claim 12, wherein the location-based service system is one or more of: GPS (Global Positioning System), Galileo, GLONASS, IRNSS, Beidou Navigation System, and QZSS (Quasi-Zenith Satellite System).

20. The method according to claim 12, wherein the three or more wireless communication technologies include: CDMA, GSM, IEEE 802.11, Wi-Fi, HSDPA, W-CDMA, WiMAX, OFDM, EVDO, UMTS, Bluetooth, EDGE and LTE.

21. The method according to claim 12, wherein while the multi-mode wireless communication device is connected to a particular wireless communication network associated with a particular wireless communication technology, the location-based service system is turned off periodically based on a physical range characteristic of the particular wireless communication technology.

22. The method according to claim 12, wherein the location-based service system is placed in a sleep mode for a pre-determined time period.

23. A computer program product comprising non-transitory computer usable medium having computer readable program code means embodied therein for causing functions of a retrieval engine for enabling a computer to provide seamless roaming in a multi-mode wireless communication device, the computer program code means in said computer program product comprising computer readable program code means for causing a computer to effect the functions of claim 12.

24. A computer program storage device, readably by machine, tangibly embodying a program of instructions executable by a marine to perform method steps for providing seamless roaming in a multi-mode wireless communication device, said method steps of claim 12.

* * * * *